Patented Feb. 24, 1942

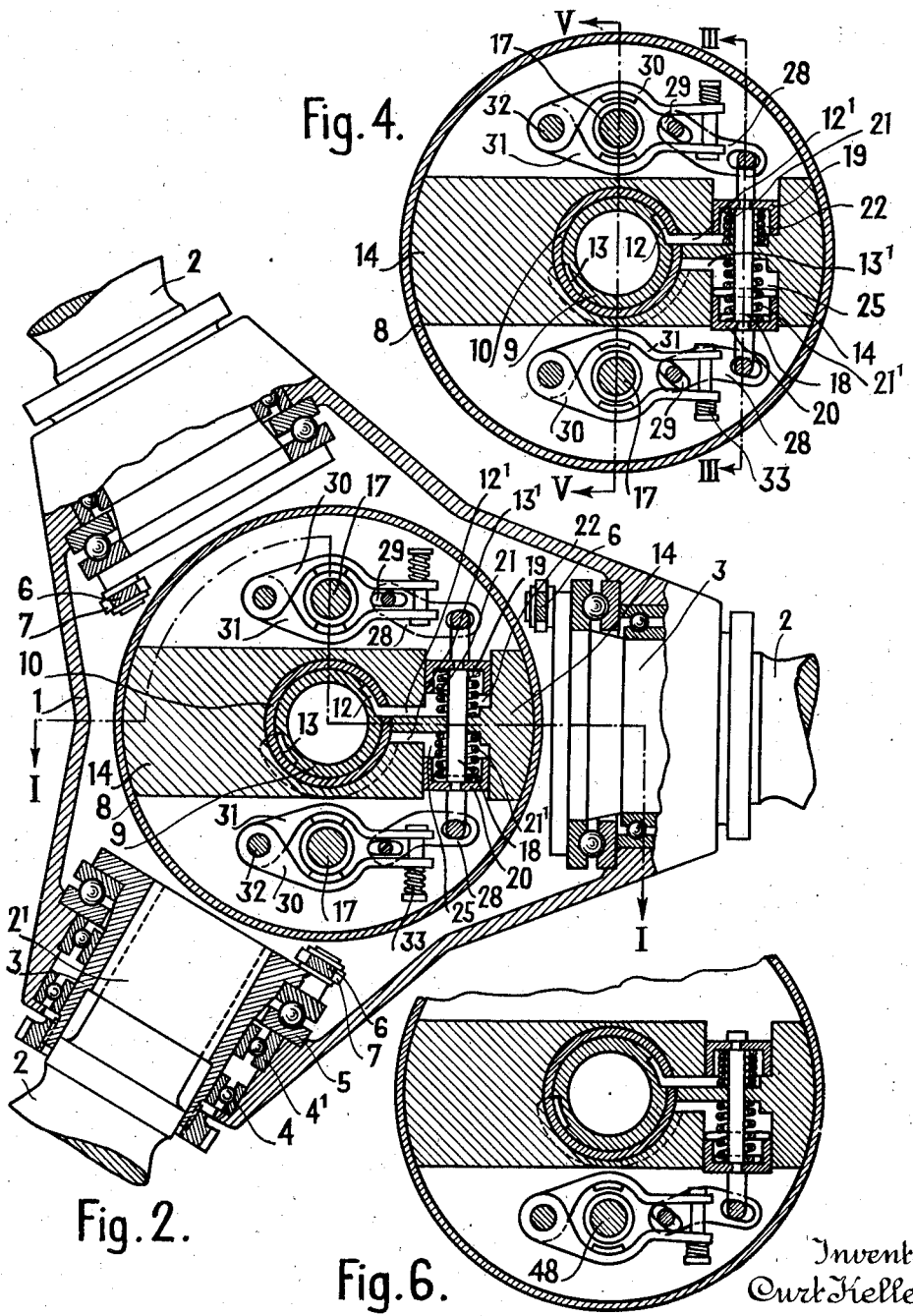

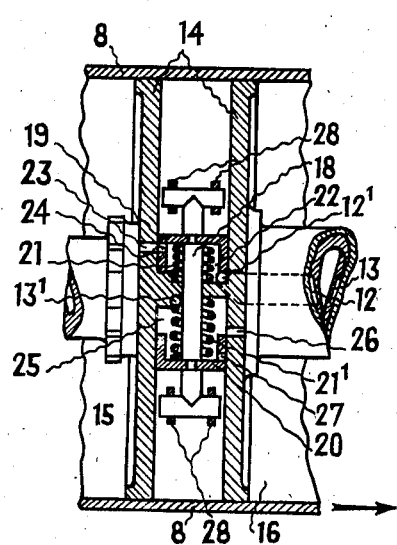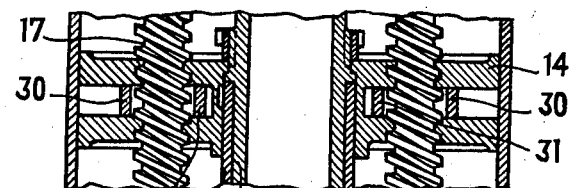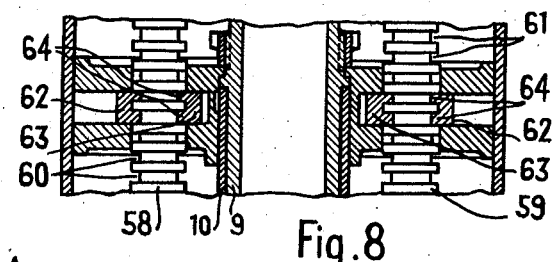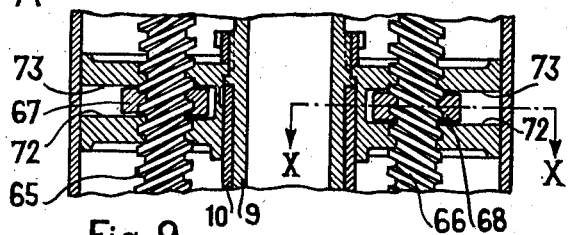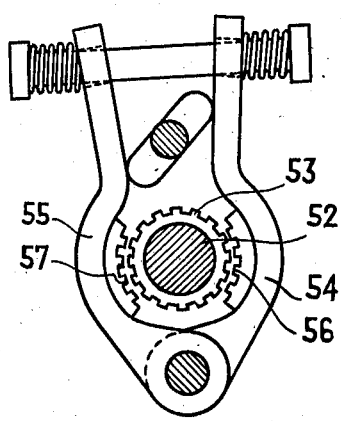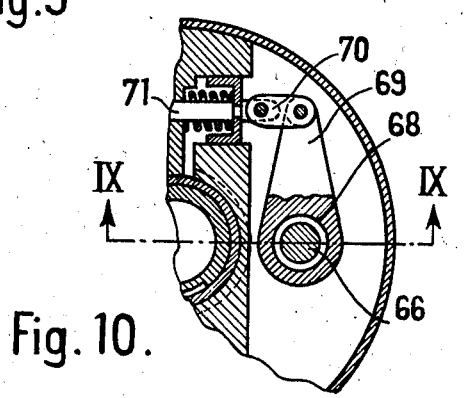

2,274,334

UNITED STATES PATENT OFFICE 2,274,334

VARIABLE-PITCH PROPELLER

Curt Keller, Zurich, Switzerland, assignor to Escher Wyss Maschinenfabriken Aktiengesellschaft, Zurich, Switzerland, a corporation of Switzerland Application April 1, 1941, Serial No. 386,339
In Switzerland April 5, 1940

6 Claims. (Cl. 170—163)

My invention relates to a locking device for the hydraulic control device of the blades of variable-pitch propellers of the type comprising a double-acting cylinder adapted to be axially adjusted by the liquid pressure, and further comprising a piston rigidly connected to the propeller hub.

An object of the invention is to improve the construction of the locking device for such pitch adjusting devices and secure greater compactness and lighter construction. The invention reduces the number of parts and permits all of the parts to be designed in such a way that they may be easily manufactured, with the result that the manufacturing costs can be appreciably reduced and the reliability in operation increased at the same time. All these advantages are attained according to the present invention by providing at least one locking spindle passing through the piston mounted within the axially adjustable cylinder, said spindle being arranged parallel to the axis of the cylinder and participating in the axial movements of the latter. In conjunction with this locking spindle clamping means are provided, which are influenced by spring pressure and by the same hydraulic pressure as that serving to adjust the blades, these clamping means preventing any axial movements of the locking spindle relatively to the piston as soon as the spring pressure exerted on these clamping means overcomes the hydraulic pressure also exerted thereon. A locking of the spindle then prevents any further axial displacement of the adjustable cylinder in relation to the piston.

Several constructional forms of the subject matter of the invention are shown by way of example in the accompanying drawings in which:

Fig. 2 shows partly a plan view of Fig. 1 and partly a section on the line II—II in Fig. 1.

Fig. 3 is a section on the line III—III in Figs. 1 and 4.

Fig. 4 shows a similar section as per Fig. 2, the parts being shown, however, in another operating position.

Fig. 5 is a section on the line V—V in Fig. 4.

Fig. 6 shows a sectional view of a locking device comprising only one locking spindle, whilst

Fig. 8 shows a modification of a detail.

Fig. 9 is a section on the line IX—IX in Fig. 10 showing a further modified form of a detail and Fig. 10 is a section on the line X—X in Fig. 9.

Fig. 11 shows a modified form of clamping jaws, which in this figure are illustrated in their opened position.

Figures 1, 7:
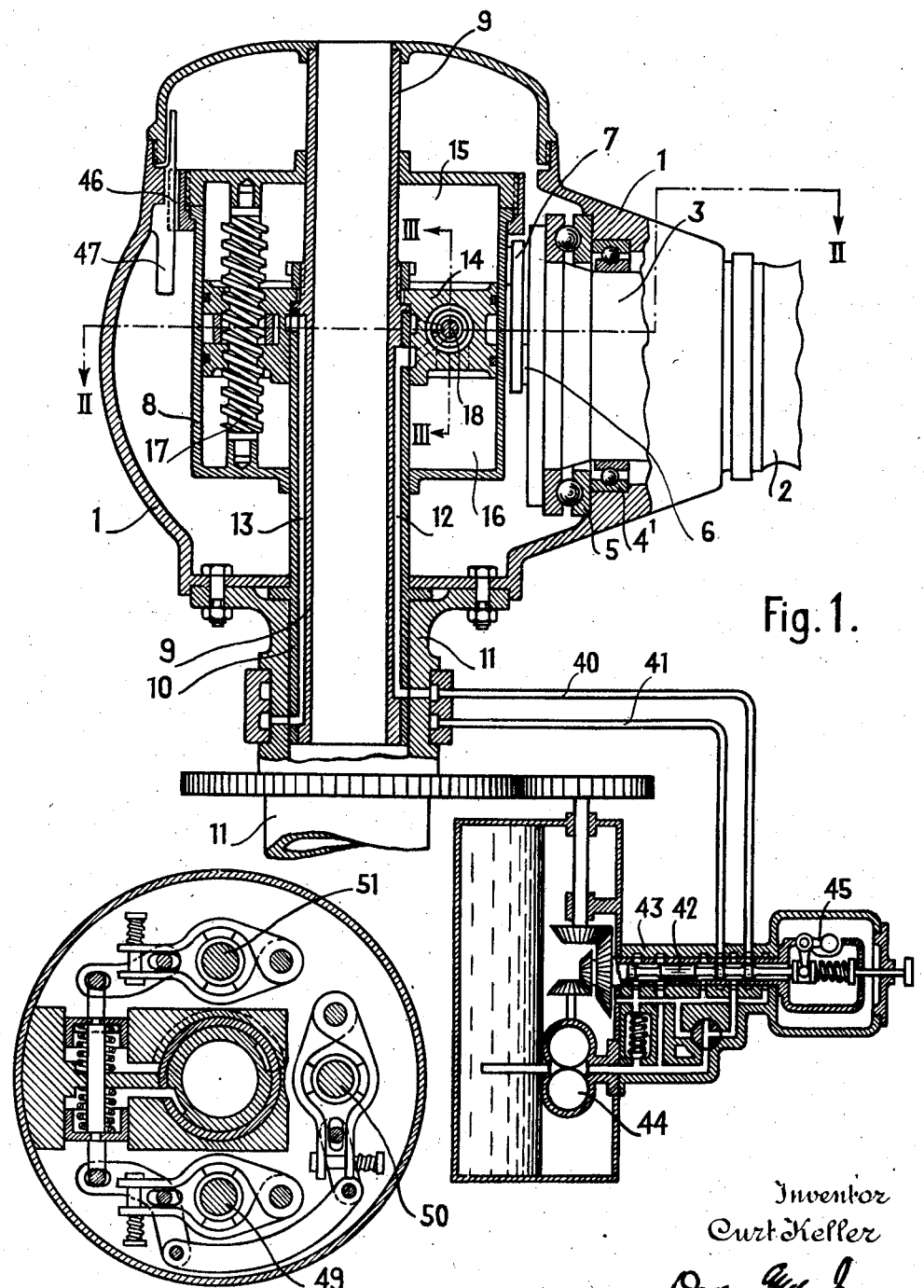
Fig. 1 shows partly a plan view and partly a longitudinal axial section on the line I—I in Fig. 2 through part of a propeller having three hydraulically adjustable blades and fitted with the novel locking device.
Fig. 7 shows a similar view of a locking device comprising three locking spindles.

Referring to the drawings and first to Figs. 1 to 5, 1 denotes the hub casing of a propeller with three adjustable blades 2. Each blade 2 is secured by its root $2^1$ in a socket 3 which is supported by bearings 4, $4^1$ and 5 (Fig. 1). Each socket 3 carries a pin 6 and to each of these pins 6 is attached a link 7, which at its other end is pivotally connected to a double-acting adjusting cylinder 8. This latter is axially movable, but is prevented from rotating relatively to the hub casing 1 by a rib 47 of this casing 1 engaging with a guide groove 46 of the cylinder 8. The latter is mounted to slide longitudinally on a hollow tube consisting of two concentric parts 9 and 10. The tube 9, 10 is fixed to the casing 1 and its rear end is lodged in the driving shaft 11 of the propeller. This driving shaft 11 is rigidly connected to the hub casing 1. In the walls of the central hollow tube 9, 10 are formed two independent longitudinal passages 12, 13, which are connected to pipes 40 and 41 (Fig. 1) respectively. 42 denotes an axially movable valve of a distributing device 43 controlling the admission of a liquid under pressure to the pipes 40 and 41 and its outflow from these pipes. The arrangement is such that when one of the pipes 40, 41 is connected to supply, the other is connected to exhaust. The distributing device 43 is connected to a pump 44 delivering said liquid under pressure, preferably oil. The control valve 42 is actuated by a centrifugal governor 45 which is driven, together with the pump 44, by the driving shaft 11 of the propeller.

The axially movable cylinder 8 is divided up into two chambers 15 and 16 by a piston 14 fixed to the tube 9, 10, said cylinder 8 sliding on this piston 14. Through the piston 14 pass two threaded locking spindles 17 arranged parallel to the axis of the cylinder 8. These locking spindles 17 are arranged in the cylinder 8 in such a manner that in normal operation they participate fully in the axial movements of the latter relatively to the piston 14. The thread of the spindle 17 has such an angle of inclination that it is not irreversible, so that a rotary movement is imparted to said spindle 17 when the cylinder 8 is adjusted axially. A piston rod 18 is lodged in a movable manner within the piston 14, and two small control pistons 19, 20 are connected in such a manner to this piston rod 18 that the three parts 18, 19, 20 inside the piston 14 can be moved together in the longitudinal direction of the spindle 18 to the same extent. Each of the small control pistons 19, 20 is subject to the action of a spring, 21 and 21¹ respectively, the springs 21, 21¹ being supported against the piston 14. The small control piston 19 confines in the piston 14 a space 22 which is connected in a given position of the piston 19 to the space 15 of the axially movable cylinder through a bore 23 (Fig. 3) in the piston 14. This space 22 is also connected to the longitudinal passage 12 through a bore 12¹. In the small control piston 19 a bore 24 is provided. The small control piston 20 in its turn limits within the piston 14 a space 25, which in a given position of this piston 20 is connected through a bore 26 (Fig. 3) in the piston 14 to the space 16 of the axially movable cylinder 8. The space 25 is also connected through a bore 13¹ with the longitudinal passage 13. In the small control piston 20 a bore 27 is likewise provided.

Each end of the above mentioned piston rod 18 is linked to a pair of levers 28 (Figs. 2 to 4). At the opposite end each pair of levers 28 is connected rigidly to a cam 29, which, on the respective lever 28 being moved as a result of a displacement of the piston rod 18, endeavours to force apart two clamping jaws 30, 31. Each pair of jaws 30, 31 is pivoted on a journal 32 supported in the piston 14 and is further under the influence of a spring 33 which endeavours to tighten the jaws 30, 31. To each locking spindle 17 is allotted such a pair of jaws 30, 31. When the small pistons 19, 20 are in their mid position, the jaws 30, 31 are tightened, i. e. they are then firmly pressed against the threaded spindles 17 by the springs 33 (see Fig. 2), so that any rotary movement of the spindle 17 and consequently also any axial movement of this spindle relatively to the piston 14 are now made impossible, which consequently also prevents further axial displacement of the double-acting cylinder 8 and with this any pitch variation of the blades 2.

The way in which the devices described work is as follows:

If normal flying conditions prevail and provided no fluctuations of load occur in the engine driving the propeller, the latter operates at the normal, preset speed. The above mentioned distributing device 42, 43 and 45 governing the admission and discharge of the pressure medium serving to adjust the blades 2 to and from the longitudinal passages 12, 13 and moved in dependence on the speed of the engine, assumes now its mid position, so that the supply of pressure liquid to both said passages 12, 13 is interrupted. The small pistons 19, 20 are thus only under the influence of the springs 21 and 21¹ respectively, and therefore also take up their mid position, in which they cover the bores 23 and 26 respectively. Thus the connections of the spaces 22 and 25 of the piston 14 to the chambers 15, 16 of the axially movable cylinder 8 are interrupted, and the jaws 30 and 31 are now pressed against the locking spindles 17, so that said cylinder 8 is prevented from carrying out any axial movements in relation to the piston 14, the blades 2 being accordingly locked in the position in which they happen to be at this moment.

If the flying conditions should change at any time, thus causing the governor to influence the above mentioned distributing device for instance in the sense that supply of pressure liquid to the passage 13 is permitted, such liquid will then gain access to the space 25 of the piston 14. The resulting liquid pressure in this space 25 then causes, against the action of the spring 21, a displacement of the small piston 20 and with it also of piston rod 18 and piston 19 from their mid position shown in Fig. 2 into the position shown in Figs. 3 and 4. At the very beginning of this displacement the piston rod 18 opens by means of the levers 28 and cams 29 the jaws 30, 31 (see Figs. 4 and 5), so that the locking spindles 17, and thus also the cylinder 8, are likewise released, the latter being now freed for an axial displacement in relation to the piston 14. Only when this is the case, does the small piston 20 uncover the bore 26 in the piston 14, so that pressure liquid from the space 25 can flow over into the space 16 of the axially movable cylinder 8. The latter is therefore displaced in the direction of the arrow A shown in Fig. 3, which is also made possible by the fact that the small piston 19 has meantime been displaced to such an extent that its bore 24 coincides with the bore 23 in the piston 14, so that the pressure liquid still contained in the space 15 of the cylinder 8 is vented through the bores 23, 24 and the space 22 into the passage 12, any back pressure being thus eliminated. From the passage 12 the outflow of liquid is no longer obstructed by the distributing device 42, 43 and 45. The locking spindles 17 participate in the longitudinal movement of the cylinder 8, whereby a turning movement is imparted to them as a result of their being designed as threaded spindles co-acting with a thread provided in the fixed piston 14 and being mounted in the cylinder 8 in a manner allowing them to rotate. A displacement of the cylinder 8 in the direction of the arrow A relatively to piston 14 causes such an adjustment of the blades 2, that the power absorbed by the propeller is changed, the result being that the engine driving the propeller will within a very short time again run at its normal, preset speed. As soon as this is the case, a further flow of pressure liquid to the passage 13 is automatically interrupted by the distributing device 42, 43, 45, so that the springs 21, 21¹ again obtain the preponderance, whereby the piston rod 18 and therewith the small pistons 19, 20 are moved back into their mid position and the jaws 30, 31 tightened. Rotary movements and consequently also any axial movements of the locking spindles 17 relatively to the piston 14 are now again prevented and therefore also further axial displacements of the cylinder 8.

If the blades 2, and therefore also the cylinder 8, have to be adjusted in the opposite sense, the distributing device 42, 43, 45 actuated in dependence on the speed of the engine driving the propeller, has to be shifted into a position in which the pressure liquid can flow into the passage 12, from whence said liquid then passes through the space 22 and the bore 23 of the piston 14 into the space 15 of the axially movable cylinder 8. At the same time pressure liquid can flow from the space 16 of this cylinder 8 through the bores 26 and 27 and the space 25 of piston 14 into the passage 13. Hereupon similar actions then take place to those described above.

The designing of the locking spindles 17 as threaded spindles offers the advantage that the axial forces are primarily taken up by the threads of the stationary piston 14, so that the clamping jaws 30 and 31 that have to co-act with said spindles have, with the exception of a relatively small force, only to prevent turning of the spindles 17. When turning of the spindles 17 is prevented, any axial movement of the latter, and consequently also any axial movements of the cylinder 8, are automatically prevented, since the threaded spindles 17 run in corresponding threads of the stationary piston 14.

The magnitude of the hydraulic pressure effecting the adjustment of the blades 2 can be determined by means of the springs 21 and 21¹, as said magnitude is dependent on the strength of these springs.

Any number of locking spindles 17 can be passed through the piston 14 in the axial direction of the axially movable cylinder 8. In certain circumstances it will be possible to attain the purpose aimed at already with a single locking spindle of the kind described. A sectional view of such a construction with only one locking spindle is shown in Fig. 6, in which the numeral 48 designates the locking spindle, whilst Fig. 7 shows a sectional view of a form of construction comprising three locking spindles 49, 50 and 51.

To facilitate the locking of the spindles by the clamping means, the raised portions of the threads of the locking spindle can be provided with teeth on their circumference, in which case also the surface of the clamping jaws which have to co-operate therewith, must be provided with such teeth. A sectional view of such a modified form is illustrated in Fig. 11, in which the reference 52 denotes a threaded locking spindle having teeth 53 on the circumference of the thread, and the numerals 54 and 55 denote clamping jaws having teeth 56 and 57 respectively.

Instead of threaded spindles, grooved spindles without thread can be used as locking spindles. Such a modification is shown in a sectional view in Fig. 8 in which locking spindles 58 and 59 are provided with grooves 60 and 61 respectively. The references 62 and 63 denote clamping jaws having teeth 64 engaging in the grooves 60 and 61 respectively of the spindles 58 and 59. In Fig. 8 the clamping jaws 62, 63 are shown in their applied position.

Figs. 9 and 10 show an embodiment in which the clamping of the threaded spindles 65 and 66 is effected by nuts 67 and 68 respectively. Each of these nuts is formed integral with an arm 69 connected to a link 70 which in its turn is connected to a piston rod 71 corresponding to the piston rod 18 of the constructional form shown in Figs. 1 to 5. On the rod 71 being axially displaced, the nuts 67 and 68 are turned on the threaded spindles 65 and 66 respectively, whereby they are pressed against the piston surface 72 or 73, so that they act as lock-nuts. When the piston rod 71 is in its mid-position, the nuts 67 and 68 are likewise in their mid-position (see Fig. 9), in which they do not prevent rotation of the threaded spindles 65, 66.

In all embodiments of the invention it is primarily a question of ensuring that the clamping members or the like, which are pivoted on the piston fixed to the tube 9, 10 are, under given operating conditions, capable of preventing axial movements of the locking spindles relatively to said piston, in order also to prevent movements of the axially displaceable cylinder relatively to the piston. Of the various constructional forms shown, that with threaded spindles offers the particular advantage that the axial forces are taken up directly by the threads, so that only a relatively small force is required to prevent turning movements of the spindles.

What I claim is:

1. A blade adjusting unit for variable pitch propellers comprising in combination a guide shaft rotating with the hub, a double acting fluid pressure motor having opposed working spaces and comprising co-acting cylinder and piston elements mounted co-axially with said shaft and each constrained to rotate therewith, the cylinder being axially movable relatively to the piston and also operatively connected to the propeller blades; locking means movably mounted in said piston and participating in the axial movements of said cylinder, clamping means swiveled on said piston and co-acting with said locking means; yielding means tending to press said clamping means towards said locking means; means for creating fluid pressure differentials in the working spaces of said motor, and fluid pressure operated means responsive to the last named means to open said clamping means when fluid pressure is brought to act on them, whilst they are again applied when said fluid pressure disappears.

2. A blade adjusting unit for variable pitch propellers comprising in combination a guide shaft rotating with the hub, a double acting fluid pressure motor having opposed working spaces and comprising co-acting cylinder and piston elements mounted co-axially with said shaft and each constrained to rotate therewith, the cylinder being axially movable relatively to the piston and also operatively connected to the propeller blades, at least one locking spindle movably mounted in the piston in the axial direction of said cylinder and participating in the axial movements of the latter, clamping means swiveled on said piston for preventing an axial displacement of said spindle in order to lock the cylinder in its momentary position, yielding means tending to press said clamping means towards said spindle, means for creating fluid pressure differentials in the working spaces of said motor, and fluid pressure operated means responsive to the last named means to open said clamping means when fluid pressure is brought to act on them whilst they are again applied when said fluid pressure disappears.

3. A blade adjusting unit for variable pitch propellers comprising in combination a guide shaft rotating with the hub, a double acting fluid pressure motor having opposed working spaces and comprising co-acting cylinder and piston elements mounted coaxially with said shaft and each constrained to rotate therewith, the cylinder being axially movable relatively to the piston and also operatively connected to the propeller blades, at least one locking spindle movably mounted in said piston parallel to the axis of said cylinder and participating in the axial movements of the latter, clamping means swiveled on said piston for preventing an axial displacement of said spindle in order to lock the cylinder in its momentary position, means for creating fluid pressure differentials in the working spaces of said motor, fluid pressure operated means responsive to the last named means and controlling the admission of pressure fluid to the working spaces of said motor, and springs acting on said fluid pressure operated means and tending to press said clamping means towards said locking spindle, the clamping means being opened before said fluid pressure operated means allow of pressure fluid passing into the working spaces of said motor, whilst these clamping means are applied as soon as the spring pressure exerted on said fluid pressure means overcomes the fluid pressure also exerted thereon.

4. A blade adjusting unit for variable pitch propellers comprising in combination a guide shaft rotating with the hub, a double acting fluid pressure motor having opposed working spaces and comprising co-acting cylinder and piston elements mounted co-axially with said shaft and each constrained to rotate therewith, the cylinder being axially movable relatively to the piston and also operatively connected to the propeller blades, at least one locking spindle movably mounted in said piston parallel to the axis of said cylinder and participating in the axial movements of the latter, clamping means swiveled on said piston for preventing an axial displacement of said spindle in order to lock the cylinder in its momentary position, means for creating fluid pressure differentials in the working spaces of said motor, two separate control members movably arranged within said piston and controlling the admission of pressure fluid to the working spaces of the cylinder, a common rod carrying said two control members and adapted to be displaced by the action of said fluid pressure in its longitudinal direction together with said control members, a spring acting on each of said control members, and means operatively connecting said rod to the clamping means in such a way that the latter are opened when fluid pressure acts on said control members, whilst they are applied as soon as the spring pressure exerted on these control members overcomes the fluid pressure also exerted thereon.

5. The combination as defined in claim 4 in which the locking spindle passing through the piston is designed as a threaded spindle.

6. The combination as defined in claim 4 in which the locking spindle passing through the piston is designed as a threaded spindle, the circumference of the raised parts of the screw threads being provided with teeth and the surfaces of the clamping means co-acting with said spindle being also provided with teeth.

CURT KELLER.